April 27, 1937. E. S. LEA Re. 20,341

HUMIDIFIER

Original Filed April 4, 1933 2 Sheets-Sheet 1

Inventor
Edward S. Lea
By Davis & Davis
Attorneys

April 27, 1937. E. S. LEA Re. 20,341
HUMIDIFIER
Original Filed April 4, 1933, 2 Sheets-Sheet 2
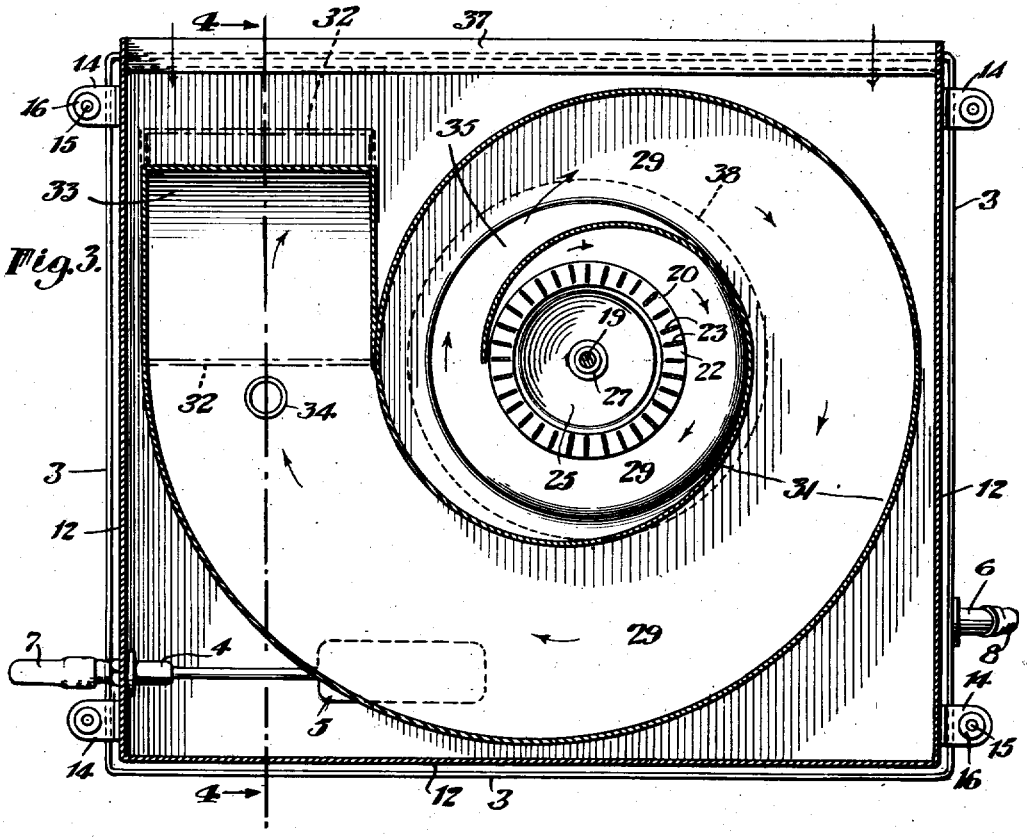
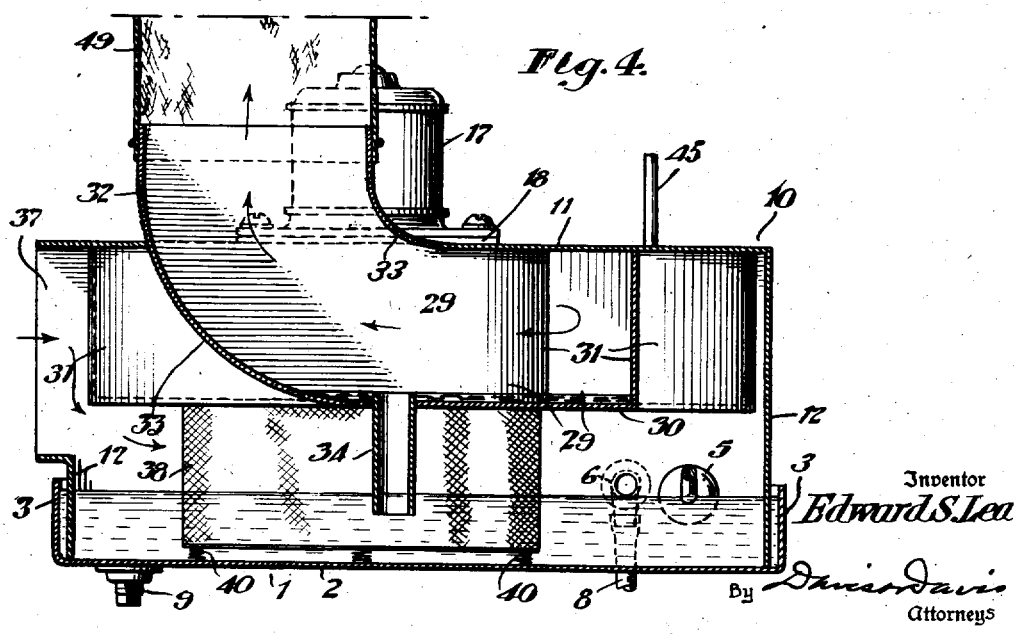
Inventor
Edward S. Lea
By Daniel Davis
Attorneys Reissued Apr. 27, 1937 Re. 20,341

UNITED STATES PATENT OFFICE 20,341

HUMIDIFIER

Edward S. Lea, Morrisville, Pa., assignor, by mesne assignments, to George Von Seebeck, New York, N. Y., trustee Original No. 1,979,630, dated November 6, 1934, Serial No. 664,300, April 4, 1933. Application for reissue December 5, 1934, Serial No. 756,123

3 Claims. (Cl. 261—91)

The apparatus of my present invention while capable of embodiment in relatively large size installations finds its preferred embodiment in a relatively small compact unit for humidifying, washing and circulating the air in homes, stores, offices and other relatively restricted enclosures.

An object of the invention is to provide a unit of this character operable during all seasons of the year to wash, deodorize, slightly cool and regulate the humidity of the air which passes through it, while removing all smoke, dust or other foreign particles.

Another object is to provide a compact air conditioning unit of simple, practical, rugged, durable construction, consisting of but few parts, silent in operation, requiring but a slight amount of power to operate and devoid of spray nozzles, pump valves or other minute openings capable of being clogged by sediment in the recirculated wash water.

Another object is to provide a unit including a water tank which may be readily detached and removed for purpose of cleaning and a device which for the most part recirculates the water which is used to wash and humidify the air so that the total amount of water used over a long period of time is a negligible factor in the cost of operation.

A feature of the invention is the use of an elongated convolute air outlet through which the moisture laden air is blown, the air in transversing this spiral passageway having its direction of flow constantly changed so that excess moisture is centrifugally deposited on the wall of the volute conduit and the wall thus wetted accomplishes the effective retention of solid particles centrifugally eliminated from the air.

As another feature of the invention water is permitted to collect to a certain depth in the bottom of the volute outlet conduit so that evaporative cooling of the air passing therethrough occurs and by arranging the conduit about the fan, the noise of the fan and the noise made by the water thrown from a dispersing device below the fan, is effectively muffled.

Another feature of the invention is an improved method of humidification wherein the air is first drawn through a heavy washing spray and then through a region of fine mist, the mist being readily absorbed by the washed air to complete humidification thereof.

Another feature is the mechanical breaking up of undesirably large drops of water carried along from the region of the heavy spray into a fine mist to promote absorption of this moisture by the air.

Figure 1:
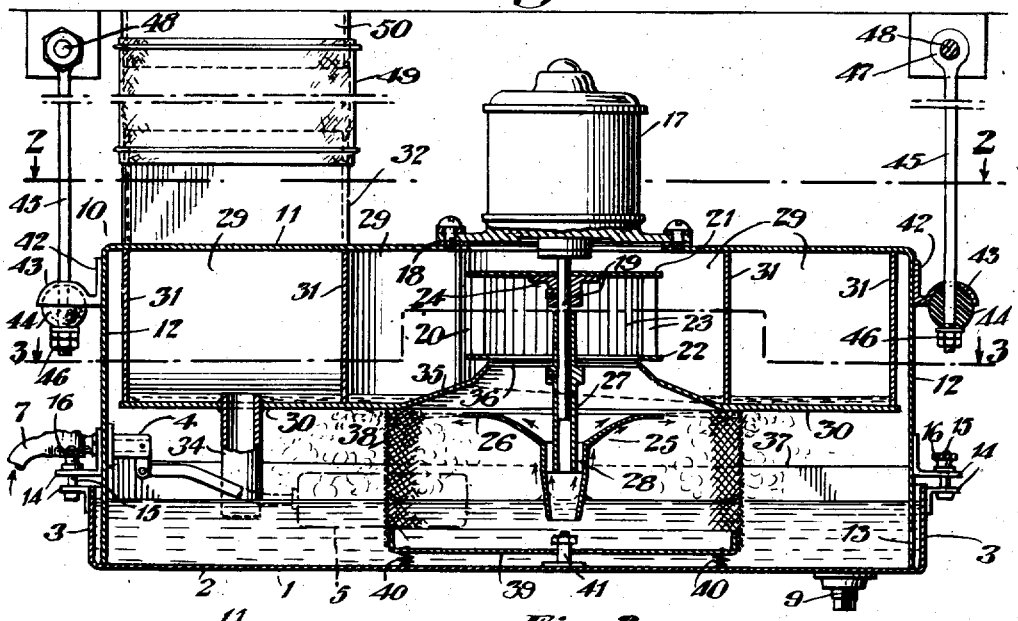
Figure 2:
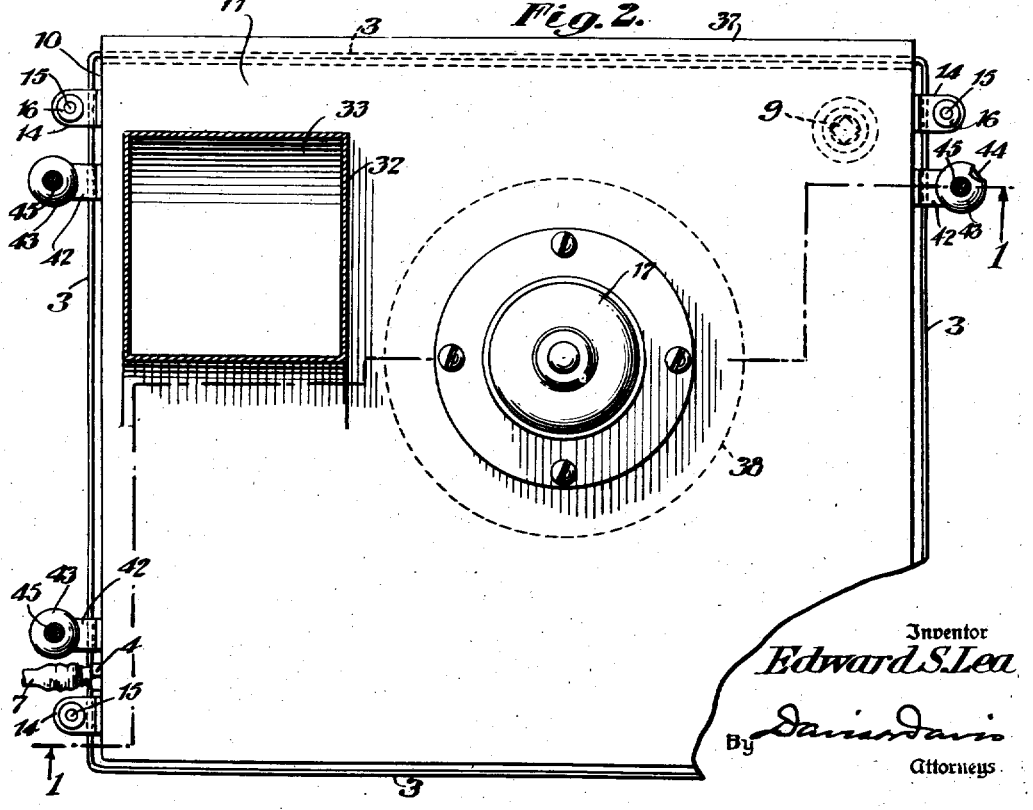

The invention may be more fully understood from the following description in connection with the accompanying drawings:

In the drawings, Fig. 1 is a vertical section taken through the humidifier, approximately on the line 1—1 of Fig. 2;

Fig. 2 a horizontal section on the line 2—2 of Fig. 1;

Fig. 3 a horizontal section on the line 3—3 of Fig. 1; and

Fig. 4 a vertical section on the line 4—4 of Fig. 3.

The structure of the humidifying device comprises an upper section, which may be operatively mounted by suspension from a ceiling, and a lower section detachably secured to the upper section and removable downwardly from the latter. Said upper section includes a motor, a fan and a water dispersing device, both driven by said motor, and a discharge conduit surrounding the fan, all assembled in a unit. The removable lower section comprises a water tank or reservoir and other elements to be described hereinafter.

The water reservoir is in the form of a shallow pan 1, rectangular in plan and having a flat bottom 2 and upstanding side walls 3. At one side of the reservoir there is an inlet valve 4. A float 5 is operatively connected to said valve to control automatically the depth of water in the reservoir. One side wall of the reservoir has an overflow spout 6. Preferably a flexible delivery hose 7 is connected to the valve, and a flexible discharge hose 8 leads from the overflow spout. The bottom of the reservoir has a drain aperture which is closed by a threaded plug 9.

The structure of the upper section of the device includes a box-like casing 10 having a flat top 11 and depending side walls 12. Said casing is rectangular in plan to conform to the reservoir 1 but is slightly smaller than the latter. The side walls of the casing extend into the reservoir and their lower edges abut the bottom of the reservoir. One of the side walls bears the water inlet valve 4. There is a surrounding lateral space between the side walls of the casing and of the reservoir and the casing has an aperture 13 through which water flows into said space. To detachably join the casing and reservoir they are provided with registering brackets 14 spaced therearound. Bolts 15 are passed through apertures in the registering brackets and have thumb nuts 16 screwed thereon.

This arrangement permits the shallow water pan of the tank to be readily disengaged from the casing and lowered for purpose of cleaning. Smoke, dust and other solid particles carried into the machine by the air, are removed during the course of air treatment and will eventually collect as a sediment in the pan and by making this pan removable, this sediment may be conveniently removed at will.

In normal operation the water in the pan is recirculated over and over again, the float valve coming into play only when the water level has been lowered due to absorption of the water by the air passing through the machine. The overflow 6 is primarily intended to take care of water which may be actually added to the tank supply when extremely hot humid air is passing through the machine and having water extracted from it rather than added to it. This will occur on hot sultry days if the temperature of the water in the pan is appreciably lower than the temperature of the air passing through the machine.

An electric motor 17 is mounted upon the upper surface of the casing 10 with its axis vertical and in a position near the center of said surface. In the present instance the motor has a supporting flange bolted to the top of the casing through a compressible sealing and vibration absorbing gasket 18. The motor has a drive shaft 19 depending into the casing and a multi-vane centrifugal fan 20 is fixed thereto. The fan is of the sirocco type. It comprises a disk-like upper head 21, an annular lower head 22 and vertical vanes 23 connecting the heads. In the present instance the vanes are straight in cross section and disposed radially, but their form and arrangement may be varied. The head 21 has a fixed collar 24 fitted on the shaft and secured thereto by a set screw. The shaft extends below the fan and bears a centrifugal water distributor 25. The latter is of substantially funnel shape. It has a reduced lower end projecting below the water level in the reservoir, and a widely flared upper end terminating in a horizontal disk-like flange 26. The mounting of the distributor comprises a sleeve 27 secured to the drive shaft by a set screw and having a spider connection 28 with the distributor.

A spiral discharge conduit 29 surrounds the fan 20. This conduit describes several convolutions in a horizontal plane. In the present instance there are two complete convolutions surrounding the periphery of the fan. The conduit is rectangular in cross section. Its upper wall is formed by the top wall 11 of the casing 10 and its bottom wall is formed by a horizontal disk-like sheet 30. The side walls are formed by a strip 31 curled in spiral form and having its upper and lower edges in sealed connection with the top and bottom walls of the conduit. Said strip leads from a point closely adjacent to the periphery of the fan, spirally outward to a point adjacent one of the side walls of the casing 10. It is curled in a manner to increase the cross section of the conduit progressively from the center outward. The fan discharges centrifugally directly into the central convolution of the conduit. Directly over the outer end of the conduit the top wall of the casing is provided with an upwardly extending discharge spout 32 into which the conduit opens. The top and bottom walls of the conduit are curved upward, as at 33, to merge with the spout. A drain pipe 34 leads downward from the bottom of the conduit into the reservoir to a point below the water level. Said pipe has its upper end projecting slightly above the bottom of the conduit.

The sheet 30 forming the bottom of the conduit is dished upward directly beneath the fan, as at 35, and has an aperture 36 in register with the aperture in the lower head of the fan. This provides a suction connection between the fan and the air space over the water level in the reservoir. At one side, the casing 10 has an air inlet 37 for said air space. In the present instance said inlet extends the full width of the side of the casing. If required an air filtering device, not shown, may be connected to the inlet.

Within the water reservoir there is a foraminous screen 38 preferably of wire mesh to cooperate with the water distributor 25 to form a fine water spray for humidifying air drawn inward through the inlet 37 by the fan. This screen surrounds the water distributor 25 and extends nearly the entire vertical distance between the sheet 30 and the bottom of the reservoir. The screen has a bottom 39, and between said bottom and the bottom of the reservoir there are springs 40. The latter press the screen upward to seal its upper edge against the sheet 30 outward of the dished portion 35 thereof. The screen is held properly positioned by any suitable means such as a stud 41 on the bottom of the reservoir extending through an aperture in the oottom of the screen and having a nut screwed on it.

For humidifying the air in a house or residence the humidifier may be advantageously placed in the cellar or basement and suspended from the ceiling. For suspension of the device, the casing 10, at opposite sides thereof, is provided with brackets 42 formed with inverted hemispherical cup portions 43. Spheres 44 of rubber or other suitable compressible shock absorbing material are fitted in said cups. Vertical suspension rods 45 are passed through apertures in the spheres and cups. At their lower ends the rods are threaded and have nuts 46 screwed thereon. Eyes 47 are formed on the upper ends of the rods and are detachably anchored in any suitable manner to the ceiling, as at 48. The discharge spout 32 delivers, preferably through a flexible conduit connector 49 of fabric or other material, to a conduit connection 50 leading upward into the house.

The device operates as follows: When the motor is started it drives both the fan and the underlying centrifugal water distributor 25. Rapid rotation of the latter causes water to rise thereon to the flat flange 26 and the flange flings a sheet of water or spray around the periphery of said flange and laterally against the surrounding screen 38. Some of it passes outward through the screen in the form of spray, some of it descends along the screen in the form of an annular film and some of it is deflected back within the screen in a finely divided state.

The water centrifugally thrown from the distributor 25 and passing through the screen 38, substantially fills the space between the water level in the tank and the bottom wall 30 of the volute outlet conduit. This projected rotary spray is acted on simultaneously by the centrifugal force of the water dispersing device or slinger, by the force of gravity and by the suction of the fan, these opposing forces resulting in a spray to substantially fill the space through which the air passes to reach the screen. The air which is drawn inwardly by the fan flows substantially countercurrent to the projected spreading spray and all of the air before reaching the fan is compelled to pass through spray outside of the screen, through the film on the screen and through the heavy spray within the screen adjacent to the periphery of the distributor 25.

As the air is drawn into the fan through the open lower end thereof it will contain a substantial amount of entrained relatively large water particles. The vanes of the fan break up these entrained drops by impact and create to some extent at least, a mist in the region of the fan so that if the air is not fully humidified by the time it reaches the fan it will avidly absorb the mist of finely sub-divided water particles at this region to effect substantially complete humidification.

The volute outlet conduit while occupying comparatively small volumetric space is of substantial length. As the air is blown through it at a substantial velocity, the direction of flow of the air stream is constantly changed and any remaining entrapped drops of water as well as any remaining solid particles, are centrifugally deposited on the wall of the spiral chamber. Thus the wall of this chamber is maintained wetted and solid particles adhere to the wetted surface and are washed downwardly into the bottom of the chamber. The action of the elongated volute conduit as an air washer is fully as effective as the action of the conventional zig-zag scrubbers which have heretofore been deemed necessary to accomplish this purpose, but it is obvious that the volute conduit imposes far less resistance to the flow of air than a standard scrubber does.

The accumulation of water in the bottom of the volute conduit to a depth determined by the projecting upper end of the drain pipe 34 provides an additional sheet of water for evaporative cooling of the air passing through the conduit. In fact the spray from the water distributor maintains the inside walls of the casing and bottom of the volute conduit wetted at all times so that the air is subjected to evaporative cooling practically from the time it enters the unit until the time it leaves the outlet conduit.

The disposition of the screen at a substantial distance from the periphery of the water distributor aids in silencing the noise of the water. The water which flows down the screen drains silently back into the tank and the water which is thrown beyond the screen is sufficiently broken up so that no heavy drops will strike violently against the sheet metal casing. Inasmuch as the screen is arranged at some distance beyond the periphery of the distributor, some of the violence of the spray will have been spent by the time it strikes the screen and this impact will be less noisy than if the screen were arranged in immediate proximity to the periphery of the distributor.

The device is designed throughout for maximum humidifying efficiency, and for compactness. It is also designed for inexpensive construction. The reservoir 1, the casing 10, the spiral wall 31 of the conduit and the bottom wall 30 of the conduit may all be made of sheet metal.

The humidifier is also designed to render it practically silent in its operation. The fan is entirely enclosed, and the double-coil spiral conduit surrounding it effectually muffles the noise of the fan and the operating noise of the water dispersing means by constantly changing the direction of the stream of air drawn through the water dispersing means and discharged from the fan. This is a most desirable feature of the device. Transmission of vibration to the ceiling is also eliminated by the shock-absorbing spheres in the suspension means and by the flexible fabric conduit connection 48. The drainage of water from the air discharge conduit to the water reservoir is also silent. The water flows down the inner wall of the drain pipe 34 and is deposited within the submerged lower end of the pipe.

What I claim is:

1. A humidifying apparatus comprising a water reservoir, a centrifugal device power driven on a substantially vertical axis to raise water from the body of water in the reservoir and sling it outward laterally in a sheet around its periphery, a foraminous annular screen surrounding the periphery of said centrifugal device to receive said sheet against it and having its lower end immersed in the body of water in the reservoir, to conduct water received against the screen from the centrifugal device downward and form an annular descending film of water on the screen, the screen being exposed to the atmosphere around its outer side, a centrifugal fan in suction connection with the space enclosed by the screen to draw its intake of air through said water film on the screen and through said sheet discharged from the centrifugal device, and a spiral discharge conduit surrounding the fan and having several convolutions with a continuous spiral wall, the central convolution being laterally open to the periphery of the fan to receive the fan discharge across the conduit and directly against said spiral wall and the conduit being adapted to conduct substantially the entire volume of air discharged from the fan continuously along a true spiral path.

2. A humidifying apparatus comprising a water reservoir, a centrifugal device power driven on a substantially vertical axis to raise water from the body of water in the reservoir and sling it outward laterally in a sheet around its periphery, a foraminous annular screen surrounding the periphery of said centrifugal device to receive said sheet against it and having its lower end immersed in the body o. water in the reservoir, to conduct the water received against the screen from the centrifugal device downward and form an annular descending film of water on the screen, the screen being exposed to the atmosphere around its outer side, a centrifugal fan on a vertical axis and in suction connection with the space enclosed by the screen to draw its intake of air through said water film on the screen and through said sheet discharged from the centrifugal device, a spiral discharge conduit having several convolutions in the same plane and surrounding the periphery of the fan and defined by a continuous spiral side wall and by top and bottom walls, the central convolution being laterally open to the periphery of the fan to receive the fan discharge across the conduit and directly against said side wall and the conduit being adapted to conduct substantially the entire volume of air discharged from the fan continuously along a true spiral path, the conduit being also adapted to hold water at its bottom along the convolutions, and drainage means to drain water from the conduit to the reservoir and adapted to maintain a definite water level in the conduit.

3. In a machine of the class described a casing having an open bottom and having an air inlet and an air outlet therein, a tank constituting a bottom for the casing and means releasably connecting the tank to the casing so that the tank may be detached and lowered for purpose of cleaning, a fan in the casing, a water distributor for elevating water from the tank and dispersing it in the path of the air passing through the casing and a motor above the casing including a pendant drive shaft upon which said fan and said dispersing means are mounted and water supply means mounted on the casing proper.

EDWARD S. LEA.